(12) United States Patent
Albrecht et al.

(10) Patent No.: US 7,173,076 B2
(45) Date of Patent: Feb. 6, 2007

(54) COMPOSITION AND METHOD RELATING TO A HOT MELT ADHESIVE

(75) Inventors: Steven W. Albrecht, Forest Lake, MN (US); Kazuya Suzuki, Hamamatsu (JP); David B. Malcolm, Maplewood, MN (US); Timothy W. Roska, Forest Lake, MN (US); Kathryn A. Coleman, St. Louis Park, MN (US)

(73) Assignee: H.B. Fuller Licensing & Financing Inc, St. Paul, MN (US)

( * ) Notice: Subject to any disclaimer, the term of this patent is extended or adjusted under 35 U.S.C. 154(b) by 10 days.

(21) Appl. No.: 10/654,167

(22) Filed: Sep. 3, 2003

(65) Prior Publication Data

US 2005/0049342 A1   Mar. 3, 2005

(51) Int. Cl.
*C08L 23/00* (2006.01)

(52) U.S. Cl. .................... 523/122; 524/505; 524/291; 524/343; 524/487

(58) Field of Classification Search ............. 523/122; 524/505, 291, 343, 487
See application file for complete search history.

(56) References Cited

U.S. PATENT DOCUMENTS

| | | | |
|---|---|---|---|
| 3,287,335 A | 11/1966 | Stuetz | |
| 3,658,741 A | 4/1972 | Knutson et al. | |
| 3,949,016 A | 4/1976 | Agouri et al. | |
| 4,197,380 A * | 4/1980 | Chao et al. | 525/199 |
| 4,284,542 A | 8/1981 | Boyce et al. | |
| 4,404,299 A | 9/1983 | Decroix | |
| 4,618,640 A | 10/1986 | Tsuchida et al. | |
| 4,654,389 A | 3/1987 | Graham et al. | |
| 4,830,926 A | 5/1989 | Mostert | |
| 5,149,741 A | 9/1992 | Alper et al. | |
| 5,286,781 A | 2/1994 | Gotoh et al. | |
| 5,382,615 A | 1/1995 | Godfrey | |
| 5,401,791 A | 3/1995 | Milks | |
| 5,401,792 A | 3/1995 | Babu et al. | |
| 5,427,850 A | 6/1995 | Gotoh et al. | |
| 5,534,575 A | 7/1996 | Foster et al. | |
| 5,747,573 A | 5/1998 | Ryan | |
| 5,928,782 A | 7/1999 | Albrecht | |
| 6,103,814 A | 8/2000 | vanDrongelen et al. | |
| 6,410,627 B1 | 6/2002 | Paul et al. | |
| 6,562,888 B1 | 5/2003 | Frihart et al. | |
| 6,946,528 B2 * | 9/2005 | Domine et al. | 526/64 |
| 2002/0161085 A1 | 10/2002 | Gibes et al. | |
| 2002/0193474 A1 | 12/2002 | Daily et al. | |

FOREIGN PATENT DOCUMENTS

| | | |
|---|---|---|
| DE | 25 23 617 A1 | 12/1976 |
| GB | 1 431 070 | 4/1976 |
| JP | 5604279 * | 4/1981 |
| JP | 56041279 | 4/1981 |
| KR | 9304704 | 6/1993 |
| WO | WO 00/00565 A1 | 1/2000 |
| WO | WO 01/34719 A1 | 5/2001 |

* cited by examiner

*Primary Examiner*—Robert D. Harlan

(57) ABSTRACT

The present invention includes methods and compositions relating to a hot melt adhesive that includes ethylene methyl methacrylate and a tackifying resin.

12 Claims, 3 Drawing Sheets

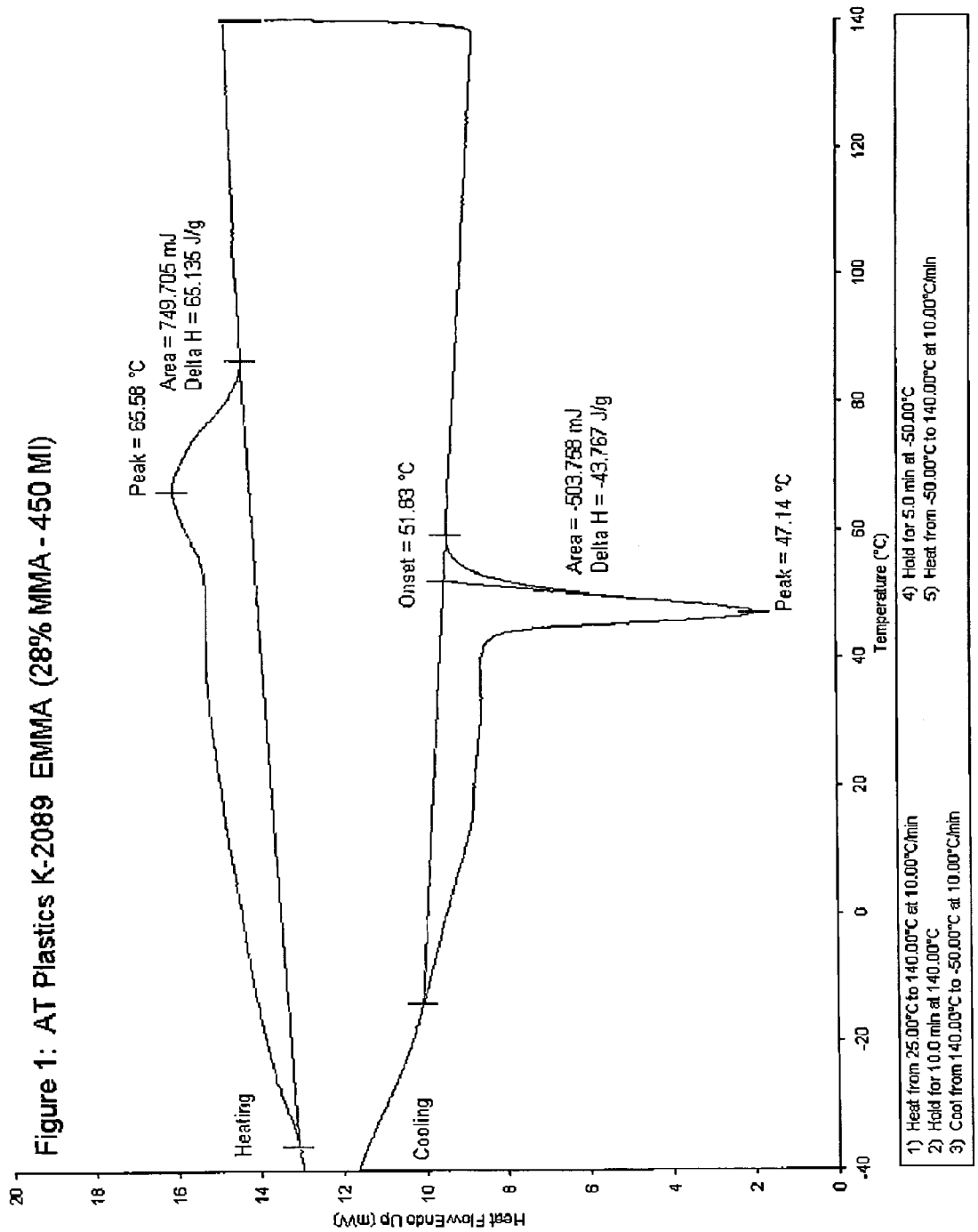

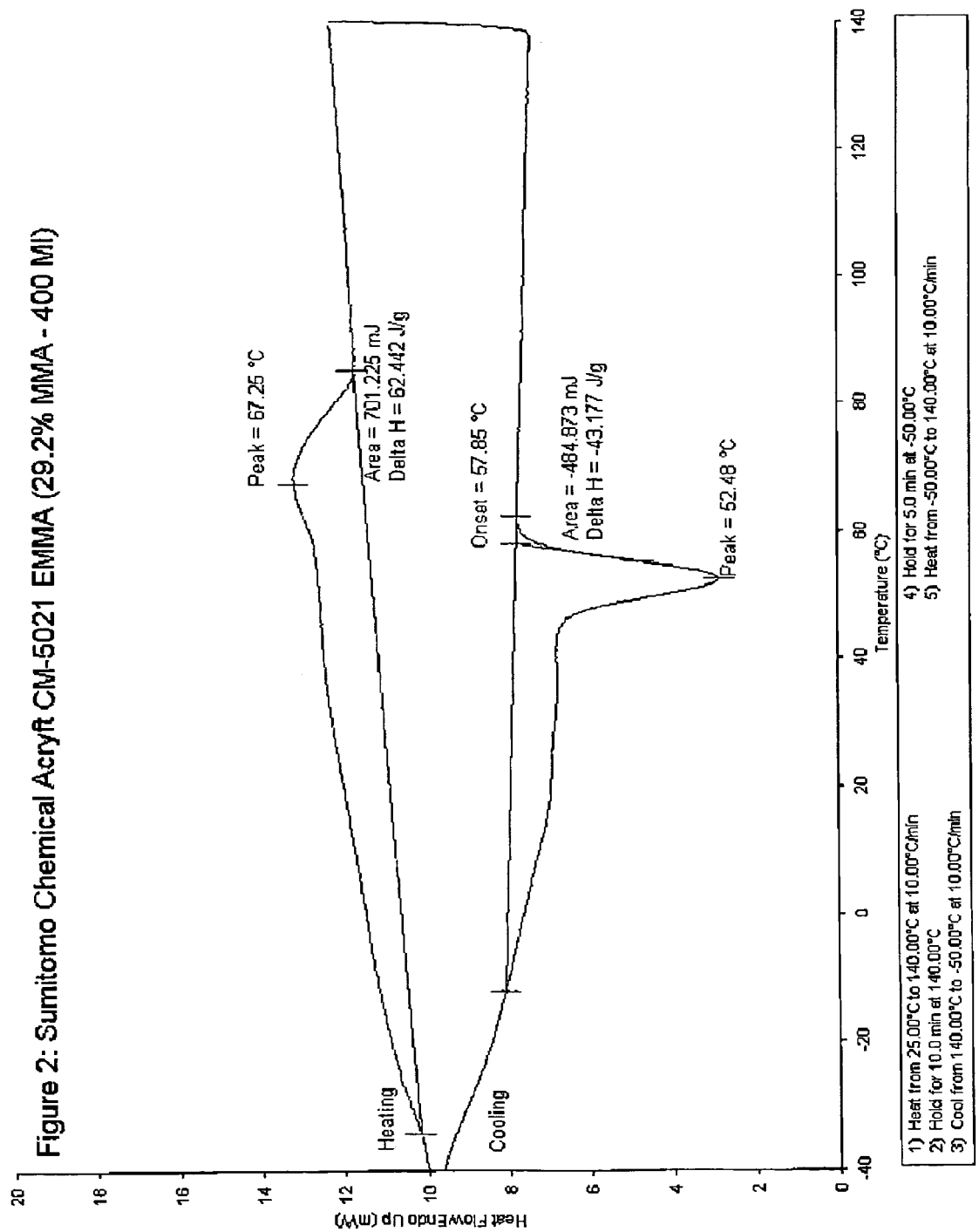

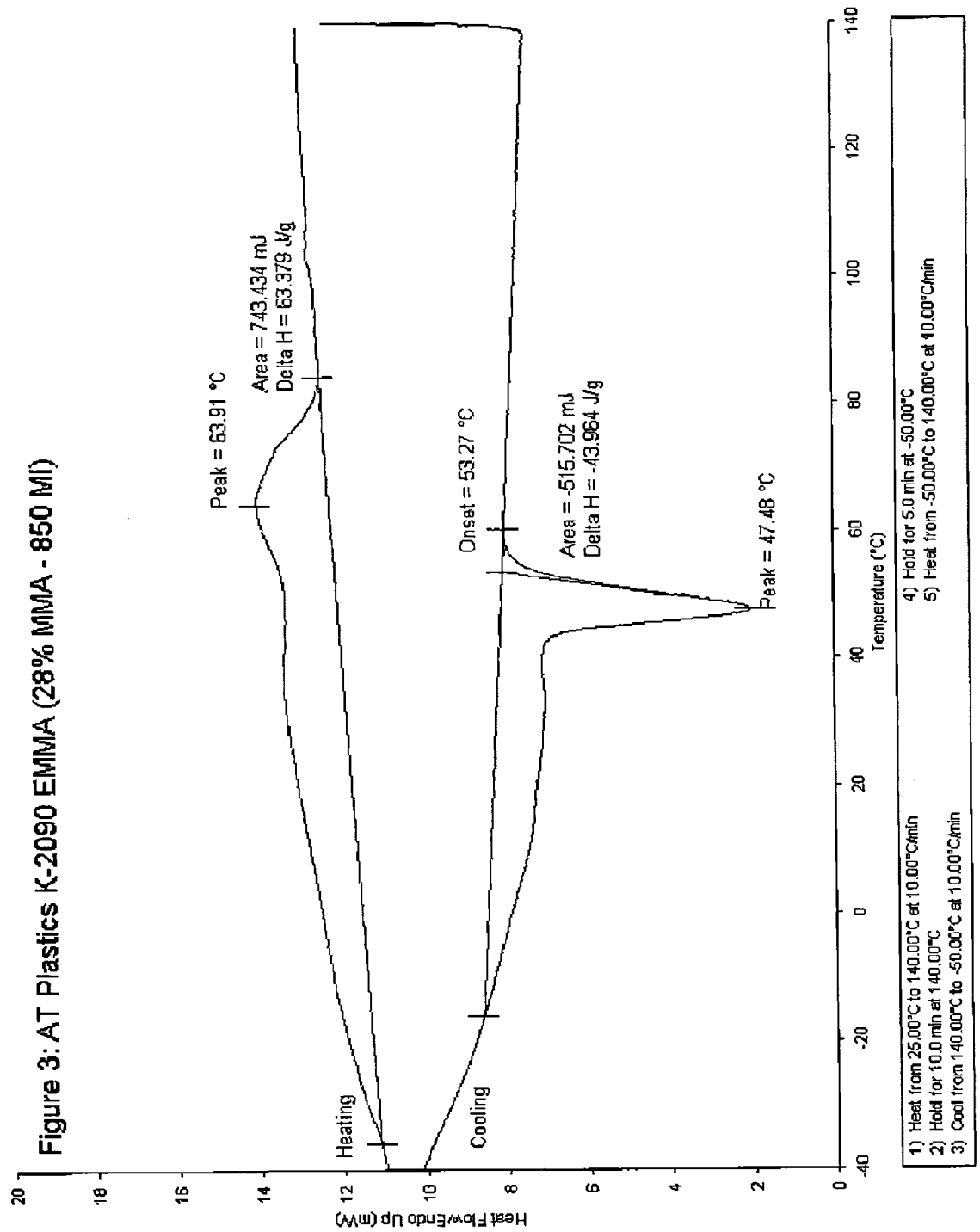

COMPOSITION AND METHOD RELATING TO A HOT MELT ADHESIVE

FIELD OF THE INVENTION

The present invention relates to a hot melt adhesive based on a composition of a copolymer of ethylene methyl methacrylate and a tackifying resin.

BACKGROUND OF THE INVENTION

The present invention relates to hot melt adhesives, which are widely used for various applications. Hot melt adhesives generally comprise materials that can be conveniently applied by extrusion or wheel application of the adhesive composition at elevated temperatures onto a workpiece to which it is desired to fix another workpiece.

Hot melt adhesives to date have had less than desirable thermal stability. That is, prior hot melt adhesives typically have a substantial viscosity change over time, darken significantly over a relatively short period of time, and produce char, skin or gel.

It is also noted that traditional hot melt adhesives have an unpleasant odor. Repeated use of such odiferous adhesives can result in a very unpleasant work environment.

Further, hot melt adhesives to date have poor bonding performance over a range of temperatures. That is, they lack satisfactory adhesiveness over a range of temperatures.

One application for hot melt adhesives is book binding. Generally, there are two different methods for manufacturing book blocks. The "one-shot" method involves the application of an adhesive directly onto the spine of the book block. The "two-shot" method involves (1) the application of a primer composition onto the spine, and then (2) the application of an adhesive composition to the surface of the dried primer composition.

Water-based adhesives have typically been used as the primer composition in book binding. However, these adhesives have a slow rate of set that can be a detriment to the production rate of the binders. While dryers and heat have been employed to facilitate drying of water-based primers, exposure to heat typically causes the water-based primer to skin over and trap moisture within the formed polymeric membrane. The trapped water in the interior of the water based primer layer can vaporize, causing the membrane to lift and form large blisters that break and burn under heat. On the other hand, if the water-based primer is not sufficiently dried, it will cause splattering and blistering upon application of a second-shot hot melt adhesive at application temperatures ranging from about 100° C. to about 200° C. due to the remaining water present in the water based primer.

Thus, hot melt adhesives are more and more commonly used as primer adhesives in the two-shot method because they improve production speed, reduce the cost of binding due to the removal of the drying units, and eliminate the drying concerns associated with water based adhesive primers. One drawback, however, of hot melt adhesives available to date has been an inability to provide aggressive adhesion to a variety of paperstocks.

Therefore, there is a need in the art for an adhesive composition that has good thermal stability in that it has little or no viscosity change, little or moderate color change, and no charring, skinning, or gelling.

There is also a need for an adhesive composition that has less odor and a less unpleasant odor than traditional hot melt adhesives.

Further, there is a need for an adhesive composition that has superior bonding performance over a wide range of temperatures.

In addition, there is a need for an adhesive composition that provides aggressive adhesion to a variety of paperstocks in the area of book binding.

BRIEF SUMMARY OF THE INVENTION

The present invention, in one embodiment, is a hot melt adhesive composition. The composition includes an ethylene methyl methacrylate copolymer and a tackifying resin. The composition may also include such additional components as oils, waxes, antioxidants, and block copolymers. In one embodiment, the composition consists essentially of an ethylene methyl methacrylate copolymer and a tackifying resin.

In an alternative embodiment, the present invention is a hot melt adhesive composition comprising an ethylene methyl methacrylate copolymer, a block copolymer, and a tackifying resin, with the proviso that the composition does not include a surfactant.

The present invention, in another embodiment, is a method of using a hot melt adhesive for book binding. The method includes providing a hot melt adhesive composition having an ethylene methyl methacrylate copolymer and a tackifying resin, and applying the composition to elements of a book being bound.

In a further embodiment, the present invention is a package formulation. The formulation includes a hot melt adhesive composition consisting essentially of an ethylene methyl methacrylate copolymer and a tackifying resin, and instructions for application of the composition to a substrate. Alternatively, the formulation includes a hot melt adhesive composition having an ethylene methyl methacrylate copolymer, a block copolymer, and a tackifying resin, and instructions for application of the composition to a substrate.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

The methods and compositions of the present invention are directed to a hot melt adhesive for use in various industries, including product assembly, packaging, book binding, bag assembly, and assembly of non-wovens. The compositions of the present invention are directed to, without limitation, standard temperature range and low application temperature hot melt adhesives. The compositions of the present invention are both thermally stable and have superior bonding performance in comparison to present technology over a wide range of temperatures. Further, the compositions of the present invention exhibit excellent adhesion to a wide range of paper types. In addition, the compositions of the present invention exhibit excellent low temperature flexibility along with high heat resistance and further exhibit exceptional heat stability in comparison to present technology.

In one aspect, the present invention is a composition of an ethylene methyl methacrylate copolymer in combination with a tackifying resin. "Ethylene methyl methacrylate" is a copolymer of ethylene and methyl methacrylate that provides flexibility and strength to the composition of the present invention.

According to one embodiment, the concentration of the methyl methacrylate in the ethylene methyl methacrylate copolymer is in an amount ranging from about 20% to about 40% by weight of the copolymer. Alternatively, the concentration ranges from about 25% to about 35% by weight of the copolymer. The melt index of ethylene methyl methacrylate according to one aspect of the invention is less than 1200. Alternatively, the melt index is less than 600.

Preparation of ethylene methyl methacrylate is known in the art and is taught in U.S. Pat. No. 3,287,335 to Stuetz, U.S. Pat. No. 3,658,741 to Knudson et al., and U.S. Pat. No. 3,949,016 to Agouri at al., which are incorporated herein by reference. Ethylene methyl methacrylate can be purchased from, for example, Sumitomo Chemical.

The concentration of the ethylene methyl methacrylate copolymer in the composition is in an amount ranging from about 10% to about 50% by weight. Alternatively, the concentration ranges from about 15% to about 45% by weight.

The term "tackifying resin" is recognized in the art and is intended to include those substances that provide tack to the composition which serves to secure elements to be bonded while the composition sets, and reduces the viscosity of the composition, making the composition easier to apply to the substrate. The tackifying resin can be, but is not limited to, rosins, rosin derivatives, terpenes, modified terpene resins, hydrocarbons, modified hydrocarbon resins, terpene phenolic resins, or pure monomer resins, such as those known in the art. The concentration of the tackifying resin in the composition of the present invention is in an amount ranging from about 15% to about 70% by weight. Alternatively, the concentration ranges from about 20% to about 60% by weight. Various tackifying resins can be purchased from, for example, Arizona Chemical, Exxon Chemical, and Eastman Chemical.

Alternatively, the composition includes a block copolymer. The term "block copolymer" is recognized in the art and is intended to include those substances that have a block of styrene, a mid-block, and optionally having another block of styrene. According to one embodiment, the block copolymer is a styrene block copolymer. For example, the block copolymer can be, but is not limited to, styrene butydiene styrene ("SBS"), styrene isoprene styrene ("SIS"), styrene ethylpropyl styrene ("SEPS"), or styrene ethylbutyl styrene ("SEBS"). The concentration of the block copolymer in the composition of the present invention is in an amount ranging from about 0% to about 15% by weight. Alternatively, the concentration ranges from about 2% to about 10% by weight. Various block copolymers can be purchased from, for example, Kraton Chemical, Kuraray America, Inc., and Dexco.

In a further alternative, the composition may include a wax. The term "wax" is recognized in the art and is intended to include any viscosity modifiers that are aliphatic in nature. The wax can be, but is not limited to, paraffin wax, microcrystalline wax, or synthetic wax. The concentration of the wax in the composition of the present invention is in an amount ranging from about 0% to about 40% by weight. Alternatively, the concentration ranges from about 5% to about 35% by weight. Various waxes can be purchased from, for example, Exxon Chemical and Bareco.

In an alternative aspect of the present invention, the composition includes an oil. The term "oil" is recognized in the art and is intended to include any plasticizer that plasticizes a hot melt adhesive. For example, the oil can be, but is not limited to, naphthinic oil, mineral oil, or paraffinic-based oil. The concentration of the oil in the composition of the present invention is in an amount ranging from about 0% to about 20% by weight.

In accordance with yet another alternative, the composition of the present invention includes an antioxidant. The term "antioxidant" is recognized in the art and is intended to include those substances that interfere with the auto-oxidation process. According to one embodiment, the antioxidant stabilizes the adhesive formulation of the present invention against degradation. The antioxidant can be, but is not limited to, Irganox 565, Irganox 1010, and Irganox 1076, which are hindered phenolic antioxidants. The concentration of the antioxidant in the composition of the present invention is in an amount ranging from about 0% to about 2% by weight. Various antioxidants can be purchased from, for example, Ciba Geigy.

According to one alternative, the composition of the present invention further includes one or more additional polymers. The additional polymers can include, but are not limited to, ethylene vinyl acetate ("EVA"), ethylene methyl acrylate ("EMA"), ethylene n-butyl acrylate ("EnBA"), ethylene ethyl acrylate ("EEA"), or interpolymers.

EVA is a copolymer of ethylene and vinyl acetate. According to one embodiment, the concentration of the vinyl acetate in the EVA copolymer is in an amount ranging from about 18% to about 40% by weight of the copolymer. The melt index of EVA according to one aspect of the invention is less than about 1100. Alternatively, the melt index of EVA is less than about 900. EVA is sold by, for example, AT Plastics and Exxon Chemical.

EMA is a copolymer of ethylene and methyl acrylate. According to one embodiment, the concentration of the methyl acrylate in the EMA copolymer is in an amount ranging from about 15% to about 30% by weight of the copolymer. The melt index of EMA according to one aspect of the invention is less than about 400. EMA is sold by, for example, Exxon Chemical.

EnBA is a copolymer of ethylene and n-butyl acrylate. According to one embodiment, the concentration of the n-butyl acrylate in the EnBA copolymer is in an amount ranging from about 28% to about 38% by weight of the copolymer. The melt index of EnBA according to one aspect of the invention is less than about 1000. EnBA is sold by, for example, Exxon Chemical.

The concentration of the additional polymer or polymers in the composition of the present invention is in an amount ranging from about 0% to about 20% by weight. Alternatively, the concentration ranges from about 5% to about 15% by weight.

In one aspect of the present invention, the composition is made in the following manner. The components of the composition, other than any polymers to be included, are blended in a molten state at any known temperature for blending components of a hot melt adhesive to form a mixture. Alternatively, the components are melted at a temperature ranging from about 150° C. to about 175° C. In one aspect of the present invention, any antioxidant component is added with the initial components. Alternatively, the antioxidant is added at any time during the preparation of the composition, including when the polymer or polymers are added. According to one embodiment, the components are melted in a forced-air type oven. Alternatively, the components are melted in any known apparatus for melting hot melt adhesive ingredients.

In one aspect of the invention, the polymer component or components are then added to the mixture. The polymer component can be added in an upright or lightening mixer. One example of such a mixer is the Stirrer Type RZRI manufactured by Caframo in Wiarton, Ontario, Canada. Alternatively, the polymer or polymers can be added by any known method or apparatus.

In accordance with one embodiment, the mixture is maintained at any known temperature for maintaining the mixture in a molten state. Alternatively, the mixture is maintained in a molten state at a temperature ranging from about 150° C. to about 175° C. In one embodiment, the temperature of the mixture is maintained using a heating mantle. One example of a heating mantle is any of those manufactured by Glas-Col in Terre Haute, Ind. Alternatively, the temperature of the mixture can be maintained by any known method or apparatus. According to one aspect of the present invention, the composition is then mixed until it is smooth and homogeneous.

In use, the composition of the present invention is applied to a substrate to be bonded with another substrate. That is, the composition is placed into known hot melt adhesive application equipment. The composition is then extruded through a nozzle on the application equipment or applied to a roller and transferred to the substrate. Finally, the substrate to which the composition was applied is mated with a second substrate and a bond is formed between the two substrates upon cooling. Alternatively, the composition is applied by any known method.

Although the present invention has been described with reference to preferred embodiments, persons skilled in the art will recognize that changes may be made in form and detail without departing from the spirit and scope of the invention.

The following examples are presented by way of demonstration, and not limitation, of the invention. Unless indicated otherwise, the following testing procedures were employed:

Melt index ("MI") is measured in accordance with ASTM D-1238, condition 190C, with 2.16 kg (formally known as condition E).

The peel adhesion failure temperature ("PAFT") is the temperature in degrees Celsius at which the bond of the sample fails. PAFT is measured in accordance with a variation of the PAFT test in ASTM D-4498. The present test method is different because the thickness of the test piece sandwich in the present method is 10 mil and the oven temperature is increased automatically rather than manually.

The shear adhesion failure temperature ("SAFT") is the temperature in degrees Celsius at which the bond of the sample fails. SAFT is measured in accordance with a variation of the SAFT test in ASTM D-4498. The present test method is different because the thickness of the test piece sandwich in the present method is 10 mil and the oven temperature is increased automatically rather than manually.

Viscosity is determined in accordance with ASTM D-3236. The measurement of viscosity is provided herein in centipoise ("CPS") or milliPascal seconds ("mPa.s") as indicated herein. The melt viscosities of the hot melt adhesives were determined on a Brookfield Thermosel Viscometer Model LVDV 2+ using an appropriate spindle.

Fiber tear ("FT") measures the percentage of fiber that covers the adhesive area after separating two substrates bonded together by a sample of the adhesive composition of the present invention at a particular temperature. FT was measured in according with the following procedure. Adhesive bonds were made using a Waldorf bond simulator as known in the art on various substrates and an application temperature of about 175° C., an open time of 1 second, 3 seconds, 5 seconds and 7 seconds, a set time (or compression time) of 2 seconds, and a bead size of ⅛ inch (0.32 cm). The resulting bonds were then conditioned at about 40° F. (about 4.5° C.) for at least 24 hours, and then separated by hand and the amount of fiber tear based on a percentage was determined. A minimum of six samples were tested for each composition of the present invention.

Service temperature ("serv temp") is the temperature range in degrees Celsius within which the sample bonds well. Serv temp is measured by examining the results of the fiber tear bonding tests described above to determine the range of temperatures that exhibit a 75% or greater fiber tearing bond. That is, the fiber tear test method is performed through a range of temperatures. These results are examined and the range of temperatures at which it is determined by subjective observation that a sample performed adequately is the service temperature range.

Open temperature ("OT") is the temperature in degrees Fahrenheit at which the adhesive sample transitions from the open (or "tacky") stage to the waxy stage. The open stage is the stage at which two substrates bonded together by a sample of an adhesive composition of the present invention can be peeled apart and put back together and the bond created by the present composition will still set. The waxy stage is the stage at which the bond will not set if the substrates are peeled apart and then put together again.

Set temperature ("ST") is the temperature in degrees Fahrenheit at which the adhesive sample transitions from the waxy stage to the fiber tearing stage. The fiber tear stage is the stage at which paper tears apart when the substrates are peeled apart.

OT and ST were measured in accordance with the following procedure. A bead of an adhesive composition of the present invention was poured onto a gradient bar and a piece of kraft paper was pressed onto the composition. The paper was allowed to bond to the composition as the adhesive cooled over 5 minutes. The paper was then peeled back to show where the phase transitions occurred. The temperature was then measured at the points of phase transition and recorded.

Open time is a measure of the longest time between application of the adhesive sample to a first substrate and the mating of the first substrate with a second after which separation of the substrates still results in 80% fiber tear as defined herein. Open time is measured in accordance with the following procedure. Adhesives bonds are made using a Waldorf bond simulator as known in the art. The open time (time between application and mating) is then varied to determine the longest open time which can be used that still results in 80% fiber tear.

Set time is a measure of the shortest compression time after which separation of the substrates still results in 80% fiber tear. Set time is measured in accordance with the following procedure. Adhesive bonds are made using a Waldorf bond simulator as known in the art. Using a predetermined open time, the set time (period of time during which the two substrates and applied adhesive sample are compressed together) is varied to determine the shortest set time at which 80% fiber tear is still achieved.

Softening point ("SP") of the sample is the temperature in degrees Celsius at which the sample melts to a predetermined extent. SP was measured in accordance with the procedure set forth in ASTM D-3461.

Heat aged softening point ("heat aged SP") is an average of softening point measurements taken at various times during a heat aging study. The measure is taken after placing the sample in a glass container and allowing the sample to stand for 200 hours or an otherwise specified period of time. It is measured in degrees Celsius. Heat aged SP was measured in accordance with the following procedure. Two to three cups of adhesive sample were measured into a pyrex or glass container. The container was then placed into an oven in which it was heated at a predetermined rate of temperature increase. During heating, the sample was monitored by a photocell. Obscuration of the light beam by sample flow triggered a response in the microprocessor.

Cleavage is a measure of an adhesive sample's heat resistance to cleavage (or bond failure). Cleavage is measured in accordance with the procedure set forth in an article entitled "Suggested Procedure for Evaluating the Heat Stress Resistance of Hot Melt Adhesives," published in the Winter 1992 edition of *The Institute of Packaging Professionals Journal* (pp. 7–9).

Creep is the time in minutes that a sample at a predetermined temperature fails when the sample is hung with a 500 gram weight. Creep was measured in accordance with the following procedure. The test piece was created in the same manner as for the cleavage test method above and placed in an oven with a 500 gram weight at a predetermined temperature for 10 minutes. An end of one strip is clipped to an attachment piece on the oven and the 500 g weight is clipped to an end of the second strip in the same configuration as that used for the SAFT test method herein. The temperature was maintained and the average time of failure was recorded. A minimum of 5 samples was used for this testing.

Heat aged viscosity is the measure of viscosity after placing the sample in a glass container and allowing the sample to stand at 180° C. for 200 hours or more as noted. It is measured in mPa.s at 180 C. Heat aged viscosity was measured in accordance the procedure set forth in ASTM D-4499. Other observations, including skin formation, gellation, and charring of the adhesive sample, are also made during this test. In addition, the viscosity increased ratio is also determined during this test.

Tensile strength is a measure of strength in tensile direction in lbs./in$^2$ or kg/cm$^2$. Tensile strength is measured in accordance with the procedure set forth in ASTM D-638.

Elongation is a measure of how much the sample stretches as a percentage of its original length. Elongation is measured in accordance with the method set forth in ASTM D-638.

Yield point is a measure of the breaking or release point when the test piece has been stretched. It is measured in psi or kg/cm$^2$ in accordance with ASTM D-638.

Cold crack is a measure of the temperature at which the sample fractures when pressure is applied to it. Cold crack was measured in accordance with the following procedure. The test is performed using a test stand that is 3 inches by ¾ inch wide and 4 to 12 inches long. The v-shaped base is created by cutting a 90 degree angle squarely from the top edge of the stand that is ½ inch deep. The stand also has an interlocking pressure bar (2½ inches by ¾ in by 4 to 12 inches long) that has a 90 degree angle v-shaped edge that fits uniformly into the v-shaped base.

To perform the test, bubble-free films of the sample are created that are 1 inch by 3 inches with a thickness of 20 to 30 mm. Three films of the sample are then placed over the v-shaped base of a test stand, leaving about an inch of overhang on each side, and the test stand is placed in a temperature chamber capable of maintaining a constant temperature at an initial temperature of 50° F. for at least an hour. Then the pressure bar is pressed into the lower v-shaped base, causing the films to bend into the 90 degree angle. Any films that crack at this temperature are noted. This procedure is repeated with new film samples and a temperature that is decreased by 5 degrees, and further repeated in 5 degree increments until 2 of the 3 films crack. The cold crack temperature is the highest temperature at which 2 of the 3 films crack.

EXAMPLE 1

Methods and Materials

The following experiment involved 17 different embodiments ("samples") of the present invention, testing various characteristics of each sample. Each sample was comprised of each of the following in variable amounts:

| | |
|---|---|
| EMMA (28–450)- | a composition of 28% methyl methacrylate and 72% ethylene (MI = 450, peak melting point = 65.58° C. ± 6° C.); |
| EMMA (28–150)- | a composition of 28% methyl methacrylate and 72% ethylene (MI = 150); |
| PX100- | a high melting-point wax; and |
| Escorez 5637- | a tackifying resin. |

Results

The results are set forth in Table 1 below.

TABLE 1

| | Sample Components | | | | | | Viscosity @ | Viscosity @ | | | | Open | |
|---|---|---|---|---|---|---|---|---|---|---|---|---|---|
| Sample | PX100 | Escorez 5637 | EMMA (28–450) | EMMA (28–150) | PAFT (deg. F.) | SAFT (deg. F.) | 250 F. (cps) | 350 F. (cps) | FT @ 0 F. (%) | FT @ RT (%) | FT @ 120 F. (%) | Temp (deg. F.) | Set Temp (deg. F.) |
| 1 | 0.35 | 0.3 | 0.1 | 0.25 | 145.3 | 196 | 3667 | 718 | 25 | 68 | 100 | 196 | 158 |
| 2 | 0.35 | 0.45 | 0.1 | 0.1 | 158.6 | 195.3 | 1257 | 240 | 0 | 0 | 3 | 190 | 163 |
| 3 | 0.3 | 0.5 | 0.1 | 0.1 | 166.2 | 194.5 | 1683 | 293 | 0 | 0 | 0 | 189 | 161 |
| 4 | 0.3 | 0.3 | 0.3 | 0.1 | 146 | 196.8 | 9600 | 1680 | 85 | 96 | 100 | 196 | 173 |
| 5 | 0.15 | 0.5 | 0.25 | 0.1 | 154 | 187 | 23500 | 2195 | 49 | 82 | 100 | 183 | 159 |
| 6 | 0.15 | 0.45 | 0.3 | 0.1 | 148.2 | 186 | 25350 | 3200 | 78 | 94 | 100 | 188 | 159 |
| 7 | 0.3 | 0.3 | 0.1 | 0.3 | 147.8 | 198.5 | 6260 | 1153 | 65 | 84 | 100 | 198 | 154 |
| 8 | 0.15 | 0.45 | 0.1 | 0.3 | 148.3 | 186 | 15420 | 2130 | 56 | 98 | 100 | 187 | 152 |
| 9 | 0.15 | 0.45 | 0.166667 | 0.2333 | 153 | 185 | 18600 | 2480 | 76 | 96 | 100 | 183 | 156 |
| 10 | 0.35 | 0.3 | 0.2 | 0.15 | 136 | 199.5 | 5075 | 870 | 76 | 88 | 100 | 193 | 137 |
| 11 | 0.35 | 0.35 | 0.1 | 0.2 | 161 | 198.3 | 2737 | 536 | 0 | 1 | 88 | 194 | 161 |
| 12 | 0.35 | 0.35 | 0.2 | 0.1 | 146 | 196.5 | 3325 | 625 | 4 | 24 | 96 | 192 | 151 |
| 13 | 0.2 | 0.5 | 0.1 | 0.2 | 155 | 188.8 | 6725 | 945 | 0 | 4 | 100 | 191 | 173 |
| 14 | 0.267 | 0.416667 | 0.216667 | 0.1 | 147.8 | 196.3 | 6200 | 1002 | 41 | 79 | 100 | 196 | 159 |

TABLE 1-continued

| Sample | Sample Components | | | | PAFT (deg. F.) | SAFT (deg. F.) | Viscosity @ 250 F. (cps) | Viscosity @ 350 F. (cps) | FT @ 0 F. (%) | FT @ RT (%) | FT @ 120 F. (%) | Open Temp (deg. F.) | Set Temp (deg. F.) |
|---|---|---|---|---|---|---|---|---|---|---|---|---|---|
| | PX100 | Escorez 5637 | EMMA (28–450) | EMMA (28–150) | | | | | | | | | |
| 15 | 0.225 | 0.375 | 0.2 | 0.2 | 144.7 | 196 | 11667 | 1862 | 76 | 96 | 100 | 191 | 173 |
| 16 | 0.225 | 0.405 | 0.17 | 0.17 | 148.3 | 192 | 10300 | 1300 | 56 | 80 | 100 | 193 | 156 |
| 17 | 0.15 | 0.5 | 0.25 | 0.1 | 151.2 | 184.5 | 23100 | 2210 | 46 | 81 | 100 | 186 | 165 |

EXAMPLE 2

Methods and Materials

The following experiment involved 4 different embodiments ("samples") of the present invention, testing various characteristics of each sample. The following components were included in varying amounts in at least some of the samples:

| | |
|---|---|
| EMMA (29.3–400)- | a composition of 29.3% methyl methacrylate and 70.7% ethylene (MI = 400, peak melting point = 67.25° C. ± 6° C.); |
| EMMA (32.4–426)- | a composition of 32.4% methyl methacrylate and 67.6% ethylene (MI = 426); |
| EMMA (29–150)- | a composition of 29% methyl methacrylate and 71% ethylene (MI = 150); |
| Imarv S-100- | tackifying resin; |
| Komotac KF454S- | tackifying resin; |
| Sasol C-80- | wax; |
| Polylets 120 SZ- | wax; |
| Evernox 76- | antioxidant; |
| Irgafos 168 (JP650) | antioxidant; |
| Sumitate KF-11 | EVA; and |
| Sumitate KC-10 | EVA. |

Results

The results are set forth in Table 2 below.

TABLE 2

| | Samples | | | |
|---|---|---|---|---|
| | Commercial Product #1 | Sample 1 | Sample 2 | Sample 3 |
| Sample Components | | | | |
| Sumitate KF-11 | 21 | | | |
| Sumitate KC-10 | 11 | 11 | | |
| EMMA (29.3–400) | | 21 | 21 | |
| EMMA (32.4–426) | | | | 21 |
| EMMA (29–150) | | | 11 | 11 |
| Imarv S-100 | 30 | 30 | 30 | 30 |
| Komotac KF454S | 16 | 16 | 16 | 16 |
| Sasol C-80 | 6 | 6 | 6 | 6 |
| Polylets 120SZ | 15.4 | 15.4 | 15.4 | 15.4 |
| Evernox 76 | 0.3 | 0.3 | 0.3 | 0.3 |
| Irgafos 168 (JP650) | 0.3 | 0.3 | 0.3 | 0.3 |
| Characteristics | | | | |
| Viscosity (mPa's/180 C.) | 693 | 698 | 713 | 688 |
| SP (0 C.) | 101.4 | 100.2 | 99.6 | 100.7 |

TABLE 2-continued

| | Samples | | | |
|---|---|---|---|---|
| | Commercial Product #1 | Sample 1 | Sample 2 | Sample 3 |
| Open Time (sec, g/m, 180 C.) | 8(13) | 9(13) | 9(14) | 7(12) |
| Set Time (sec, g/m, 180 C.) | 25-(1) | 24(1) | 24(1) | 25-(1) |
| PAFT (deg. C.) | 56 | 56 | 57 | 58 |
| SAFT (deg. C.) | 79 | 80 | 80 | 80 |
| Cleavage (deg. C.) | 64 | 66 | 66 | 66 |
| Creep (min, 60 C., 500 g) | 19.9 | 28.9 | 33.6 | 25.7 |
| Service Temp (deg. C.) | 0–50 | −5–50 | 0–50 | 0–50 |
| Heat Aged Vis (mPa's/180 C.) | 825 | 713 | 700 | 675 |
| Heat Aged SP (deg. C.) | 102.2 | 100.8 | 100.1 | 101.6 |

EXAMPLE 3

Methods and Materials

The following experiment involved 6 different embodiments ("samples") of the present invention, testing various characteristics of each sample. The following components were included in varying amounts in at least some of the samples:

| | |
|---|---|
| Acryft EMMA (29–150)- | a composition of 29% methyl methacrylate and 71% ethylene (MI = 150); |
| Acryft EMMA (29.3–400)- | a composition of 29.3% methyl methacrylate and 70.7% ethylene (MI = 400); |
| Acryft EMMA (32.4–426)- | a composition of 32.4% methyl methacrylate and 67.6% ethylene (MI = 426); |
| NUC-6070 EEA (25–250)- | a composition of ethylene ethyl acrylate comprising 25% ethyl acrylate (MI = 250); |
| Sylvares TP-2040- | tackifying resin; |
| Sylvares ZT-105 L/501 L | tackifying resin; |
| Komotac KF-454 S- | tackifying resin; |
| Esmax 180 F (Micro 180 F)- | wax; |
| Himic-1080 (Micro 180 F)- | wax; |
| Paraffin Wax 150 F- | wax; |
| Sasol C-80- | wax; |
| RM 6197 | co-extrusion coating; and |
| Evernox-10 | antioxidant. |

Results

The results are set forth in Table 3 below.

TABLE 3

| | Samples | | | | | |
|---|---|---|---|---|---|---|
| Sample Components | Comm. Prod. #2 | Sample 1 | Sample 2 | Sample 3 | Sample 4 | Sample 5 |
| Acryft EMMA (29–150) | | 16.0 | 16.0 | 14.0 | 14.0 | 8.0 |
| Acryft EMMA (29.3–400) | | 10.0 | | | | |

TABLE 3-continued

| Sample Components | Comm. Prod. #2 | Sample 1 | Sample 2 | Sample 3 | Sample 4 | Sample 5 |
|---|---|---|---|---|---|---|
| Acryft EMMA (32.4–426) | — | 11.5 | 22.0 | 24.0 | 24.0 | 32.0 |
| NUC-6070 EEA (25–250) | | | | | | |
| Sylvares TP-2040 | | 5.0 | 5.0 | | | 3.0 |
| Sylvares ZT-105L/501L | | 20.0 | 20.0 | 20.0 | 20.0 | 20.0 |
| Komotac KF-454S | | 20.0 | 20.0 | 24.0 | 24.0 | 20.0 |
| Himic-1080 (Micro 180F) | | 12.0 | 12.0 | 13.0 | 15.0 | 12.0 |
| Sasol C-80 | | 2.5 | 2.0 | 2.0 | | 2.0 |
| RM-6197 | | 2.5 | 2.5 | 2.5 | 2.5 | 2.5 |
| Evernox-10 | | 0.5 | 0.5 | 0.5 | 0.5 | 0.5 |

| Characteristics | Comm. Prod. #2 | Sample 1 | Sample 2 | Sample 3 | Sample 4 | Sample 5 |
|---|---|---|---|---|---|---|
| Viscosity (mPa's @ 180 C.) | 1,538 | 1,688 | 1,910 | 1,653 | 1,603 | 1,640 |
| SP (deg. C.) | 86.9 | 84.7 | 86.5 | 84.1 | 83.1 | 85.0 |
| Open Time (sec, g/m, 180 C.) | 20 | 18 | 17 | 19 | 18 | 17 |
| Set Time (sec, g/m, 180 C.) | 5 | 4 | 5 | 5.5 | 6 | 5 |
| PAFT (deg. C.) | 52 | 55 | 65 | 51 | 51 | 51 |
| SAFT (deg. C.) | 70 | 69 | 67 | 67 | 66 | 67 |
| Tensile Strength (kg/cm2) | 17.0 | | 33.2 | 24.8 | 23.0 | 22.2 |
| Elongation (%) | 940 | | 606 | 643 | 574 | 627 |
| Cold Crack (deg. C.) | −6 | | 6 | 4 | 4 | −6 |
| Creep (min @ 60 C., 500 g) | 98.3 | 98.3 | 125.6 | 95.4 | 62.2 | 79 |
| Heat Aged Vis (mPa's @ 180 C.) | 1,750 | 1,750 | 1,818 | | | |
| Vis Increased Ratio (%) | 13.8 | 3.7 | −4.8 | −100.0 | −100.0 | −100.0 |
| Heat Aged SP (deg. C.) | 85.2 | 85.2 | 85.6 | | | |

EXAMPLE 4

Methods and Materials

The following experiment involved 3 different embodiments ("samples") of the present invention, testing various characteristics of each sample. The following components were included in varying amounts in at least some of the samples:

| | |
|---|---|
| Acryft EMMA (32.4–426) | a composition of 32.4% methyl methacrylate and 67.6% ethylene (MI = 426); |
| Acryft EMMA (29–150) | a composition of 29% methyl methacrylate and 71% ethylene (MI = 150); |
| Acryft EMMA (29.3–400) | a composition of 29.3% methyl methacrylate and 70.7% ethylene (MI = 400); |
| HiMic 1080- | wax; |
| Sasol C-80- | wax; |
| Komotac KF 454 S- | tackifying resin; |
| Sylvares ZT 105- | tackifying resin; |
| Sylvares TP 2040- | tackifying resin; |
| Irganox 1010 | antioxidant |
| Enable EN 33330- | an EnBA copolymer composition of 33% nBA (MI = 330); |
| Enable EN 33900- | an EnBA copolymer composition of 33% nBA (MI = 900); |
| Optema TC140 | an EMA copolymer composition of 21.5% MA (MI = 125); and |
| RM 6197 | co-extrusion coating. |

Results

The results are set forth in Table 4 below.

TABLE 4

| | Comm. Prod. #2 | Comm. Prod. #2 w/ EMMA | Sample 1 | Sample 2 |
|---|---|---|---|---|
| Acryft EMMA (32.5–426) | | 11.5 | | 32 |
| Acryft EMMA (29–150) | | 16 | | 8 |
| Acryft EMMA (29.3–400) | | 10 | | |
| HiMic 1080 | 12 | 12 | 11 | 12 |
| C-80 | 2.5 | 2.5 | 5 | 2 |
| Komotac KF 454S | 20 | 20 | 20 | 20 |
| Sylvares ZT 105 | 20 | 20 | 15 | 20 |
| Sylvares TP 2040 | 5 | 5 | 7.5 | 3 |
| Irganox 1010 | 0.5 | 0.5 | 0.5 | 0.5 |
| Enable EN 33330 | 20 | | 38.5 | |
| Enable EN 33900 | 5 | | | |
| Optema TC140 | 12.5 | | | |
| RM 6197 | 2.5 | | 2.5 | 2.5 |

TABLE 5

Results

| Sample | Viscosity @ 350 F. (cps) | PAFT (° F.) | SAFT (° F.) | Tensile Strength (psi) | Elongation (%) | Yield Pt (psi) | Cold Crack (° F.) |
|---|---|---|---|---|---|---|---|
| Comm. Prod. #2 | 1840 | 131 | 161 | 340 | 453 | 311 | 30 |
| Comm. Prod. #2 w/ EMMA | 1830 | 137.8 | 158.5 | 571 | 488 | 475 | 40 |
| Sample 1 | | 126.9 | 161 | 239 | 469 | 238 | 20 |
| Sample 2 | 1780 | | | 297 | 491 | 292 | 35 |

EXAMPLE 5

Methods and Materials

The following experiment involved 3 different embodiments ("samples") of the present invention, testing various characteristics of each sample. The following components were included in varying amounts in at least some of the samples:

| | |
|---|---|
| Acryft EMMA (32.4–426) | a composition of 32.4% methyl methacrylate and 67.6% ethylene (MI = 426); |
| Acryft EMMA (29–150) | a composition of 29% methyl methacrylate and 71% ethylene (MI = 150); |
| HiMic 1080- | wax; |
| Sasol C-80- | wax; |
| Komotac KF 454 S- | tackifying resin; |
| Sylvares ZT 105- | tackifying resin; |
| Sylvares TP 2040- | tackifying resin; |
| Irganox 1010 | antioxidant |
| Enable EN 33330- | an EnBA copolymer composition of 33% nBA (MI = 330); |
| Enable EN 33900- | an EnBA copolymer composition of 33% nBA (MI = 900); |
| Optema TC140 | an EMA copolymer composition of 21.5% MA (MI = 125); and |
| RM 6197 | co-extrusion coating. |

Results

The results are set forth in Table 5 below.

TABLE 5

| | Samples | | |
|---|---|---|---|
| | Comm. Prod. #2 | Sample 1 | Sample 2 |
| Sample Components | | | |
| HiMic 1080 | 12 | 12 | 12 |
| C-80 | 2.5 | 2 | 2 |
| Komotac KF 454S | 20 | 20 | 20 |
| Sylvares ZT 105 | 20 | 20 | 20 |
| Sylvares TP 2040 | 5 | 5 | 3 |
| Irganox 1010 | 0.5 | 0.5 | 0.5 |
| Enable EN 33330 | 20 | | |
| Enable EN 33900 | 5 | | |
| Optema TC140 | 12.5 | | |
| Acryft EMMA 32.5–426 | | 22 | 32 |
| Acryft EMMA 29–150 | | 16 | 8 |
| RM 6197 | 2.5 | 2.5 | 2.5 |
| Characteristics | | | |
| Viscosity @ 350 | 1840 | 1830 | 1780 |
| PAFT (° F.) | 131 | 137.8 | 133.4 |
| SAFT (° F.) | 161 | 158.5 | 156 |
| Tensile | 340 | 571 | 297 |
| Elongation | 500 | 488 | 491 |
| Yield Point | 300 | 475 | 292 |
| Cold Crack (° F.) | 30 | 45 | 35 |

EXAMPLE 6

Methods and Materials

The following experiment involved 5 different embodiments ("samples") of the present invention, testing various characteristics of each sample. The samples were comprised of components as set forth in Table 6 below.

TABLE 6

| | Samples | | | | |
|---|---|---|---|---|---|
| Components | Sample 1 | Sample 2 | Sample 3 | Sample 4 | Sample 5 |
| Escorez 5637 | 30 | 32.8 | | | |
| TP 2040 | | | 32.8 | | |
| Kristalex 3100 | | | | 24 | 23 |
| 5023 | | 10 | 10 | | |
| 5021 | 40 | 28.9 | 28.9 | 26 | 28.5 |
| Para. 155 | | | | 31 | 30.5 |
| PX-100 | 30 | 28.3 | 28.3 | | |
| RE-100 | | | | 19 | 18 |

Results

The results for each sample were compared with results for similar commercial products. The results are set forth in Table 7 below.

TABLE 7

Test Results

| Adhesive | Viscosity @ 350° F. (cP) | PAFT (° F.) | SAFT (° F.) |
|---|---|---|---|
| Sample 1 | 955 | 130 | 195 |
| Sample 2 | 1150 | 145 | 196 |
| Sample 3 | 1212 | 141 | 193 |
| Comm. Prod. #3 | 785 | 160 | 195 |
| Comm. Prod. #4 | 1000 | 130 | 145 |
| Comm. Prod. #5 | 1000 | 140 | 198 |

Fiber Tear %

| | −20° F. | 0° F. | 40° F. | RT | 120° F. | 130° F. | 140° F. |
|---|---|---|---|---|---|---|---|
| Sample 1 | 68 | 92 | 98 | 99 | 100 | 95 | 33 |
| Sample 2 | 86 | 85 | 93 | 95 | 100 | 100 | 48 |
| Sample 3 | 81 | 82 | 96 | 92 | 100 | 59 | 25 |
| Comm. Prod. #3 | 11 | 32 | 83 | 82 | 100 | 98 | 81 |
| Comm. Prod. #4 | 68 | 92 | 100 | 86 | 100 | 40 | 11 |
| Comm. Prod. #5 | 0 | 0 | 14 | 64 | 100 | 18 | 4 |

Analysis

With respect to the standard temperature range products, samples 8040-24-1 and 8040-24-2 both provide better performance than HL-7268. 8040-24-2 compares favorably with HL-9256, having a wider temperature range than HL-9256 because it has much better bonding at −20° F. and 0° F., only falling off in comparison to HL-9256 at 140° F. Sample 8040-24-3 compares favorably to HM-2835-Y in all testing.

We claim:

1. A hot melt adhesive composition comprising:
   (a) an ethylene methyl methacrylate copolymer having a peak melting point of no greater than about 67° C.±6° C.;
   (b) a wax; and
   (c) a tackifying resin,
with the proviso that the composition does not include a surfactant or a copolymer of ethylene and n-butyl acrylate.

2. The composition of claim 1 further comprising an oil.

3. The composition of claim 1 further comprising an antioxidant.

4. The composition of claim 1 further comprising a copolymer.

5. The composition of claim 1 further comprising a block copolymer.

6. A package formulation comprising:
   (a) the composition of claim 1; and
   (b) instructions for application of the composition to a substrate.

7. A hot melt adhesive composition consisting essentially of:
   (a) an autoclave reactor ethylene methyl methacrylate copolymer;
   (b) a wax; and
   (c) a tackifying resin.

8. The composition of claim 7 further consisting essentially of an oil.

9. The composition of claim 7 further consisting essentially of an antioxidant.

10. The composition of claim 7 further consisting essentially of a block copolymer.

11. A method of using a hot melt adhesive composition comprising:
    (a) providing a hot melt adhesive composition comprising:
        (i) an ethylene methyl methacrylate copolymer having a peak melting point of no greater than about 67° C.±6° C.; and
        (ii) a tackifying resin, with the proviso that the composition does not include a surfactant or a copolymer of ethylene and n-butyl acrylate; and
    (b) applying the composition to a substrate.

12. The method of claim 11 wherein the method is a method of using the hot melt adhesive for book binding.

* * * * *